(12) United States Patent
Journet et al.

(10) Patent No.: US 11,436,346 B2
(45) Date of Patent: Sep. 6, 2022

(54) DEVICE FOR PROTECTING ENCRYPTED DATA AND ASSOCIATED METHOD

(71) Applicants: STMicroelectronics (Grenoble 2) SAS, Grenoble (FR); STMicroelectronics (Rousset) SAS, Rousset (FR)

(72) Inventors: Fabien Journet, Grenoble (FR); Yanis Linge, Fuveau (FR)

(73) Assignees: STMICROELECTRONICS (GRENOBLE 2) SAS, Grenoble (FR); STMICROELECTRONICS (ROUSSET) SAS, Rousset (FR)

( * ) Notice: Subject to any disclaimer, the term of this patent is extended or adjusted under 35 U.S.C. 154(b) by 89 days.

(21) Appl. No.: 16/866,088

(22) Filed: May 4, 2020

(65) Prior Publication Data

US 2020/0364353 A1  Nov. 19, 2020

(30) Foreign Application Priority Data

May 17, 2019  (FR) ...................... 1905209

(51) Int. Cl.
*G06F 21/60* (2013.01)
*G06F 9/30* (2018.01)
*G06F 21/84* (2013.01)
*H04L 9/08* (2006.01)

(52) U.S. Cl.
CPC ........ *G06F 21/602* (2013.01); *G06F 9/30029* (2013.01); *G06F 9/30101* (2013.01); *G06F 21/84* (2013.01); *H04L 9/0869* (2013.01)

(58) Field of Classification Search
CPC .... G06F 21/602; G06F 21/84; G06F 9/30029; G06F 9/30101; H04L 9/0869
See application file for complete search history.

(56) References Cited

U.S. PATENT DOCUMENTS

| 2001/0053220 | A1 | 12/2001 | Kocher et al. | |
|---|---|---|---|---|
| 2005/0232430 | A1 | 10/2005 | Gebotys | |
| 2012/0045061 | A1* | 2/2012 | Danger | H04L 9/003 380/277 |
| 2013/0129081 | A1* | 5/2013 | Guillet | H04L 9/003 380/28 |
| 2013/0283115 | A1* | 10/2013 | Sazeides | H03M 13/033 714/752 |
| 2016/0065369 | A1* | 3/2016 | Kakutani | G06F 21/70 380/286 |

\* cited by examiner

*Primary Examiner* — Jung W Kim
*Assistant Examiner* — Sangseok Park
(74) *Attorney, Agent, or Firm* — Slater Matsil, LLP

(57) ABSTRACT

A method and device for protecting encrypted data are disclosed. In an embodiment an integrated circuit includes a secure module including a first register containing a first mask and a second register containing masked data, the first mask and the masked data forming a secret key and a processor configured to generate a second mask and mask the secret key with the second mask when the secret key is not used for an encryption operation and during reception of a validation signal, wherein the first and second registers are disposed in the secure module so that the outputs of the registers are not simultaneously optically viewable.

18 Claims, 2 Drawing Sheets

[Fig. 1]
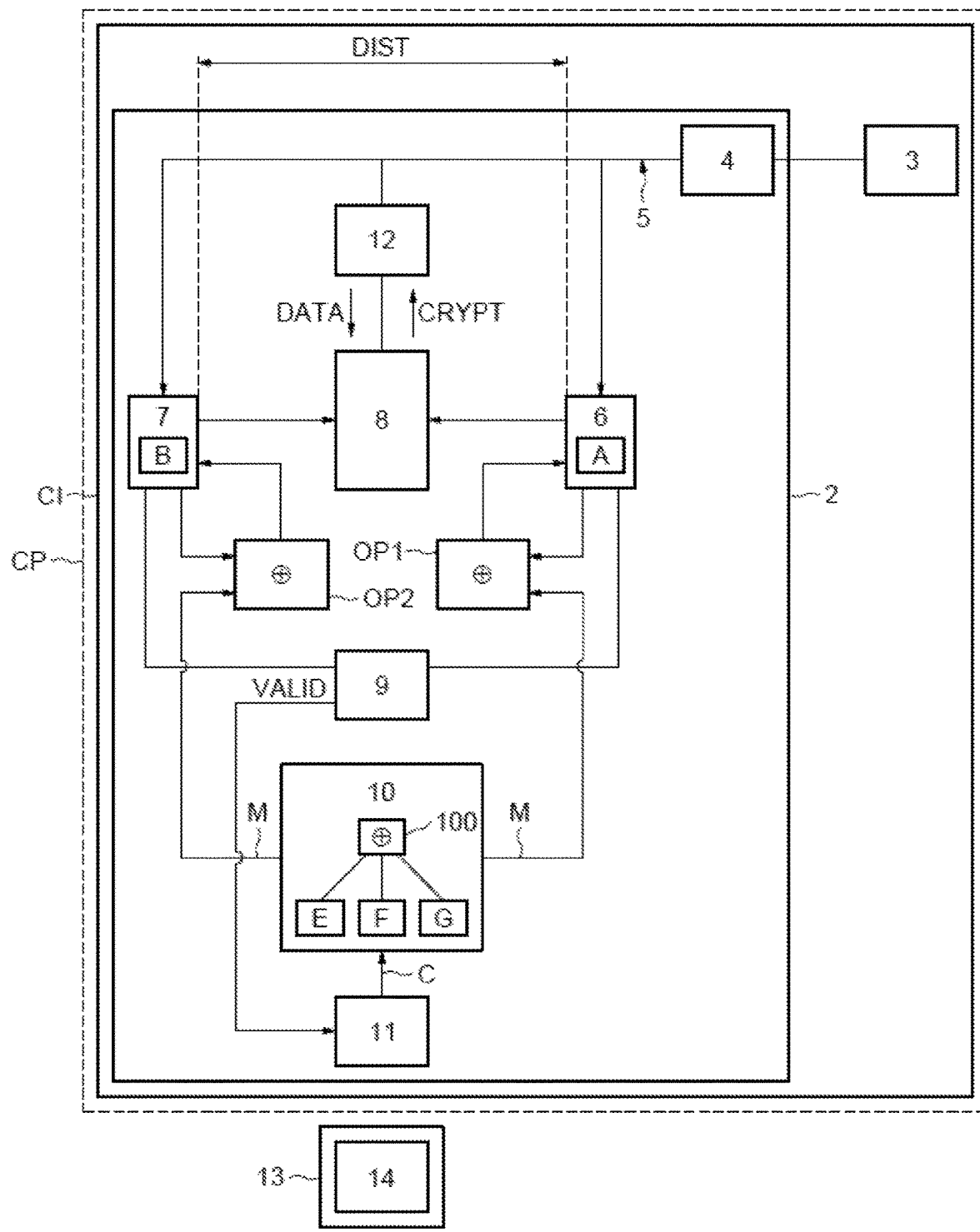

[Fig. 2]
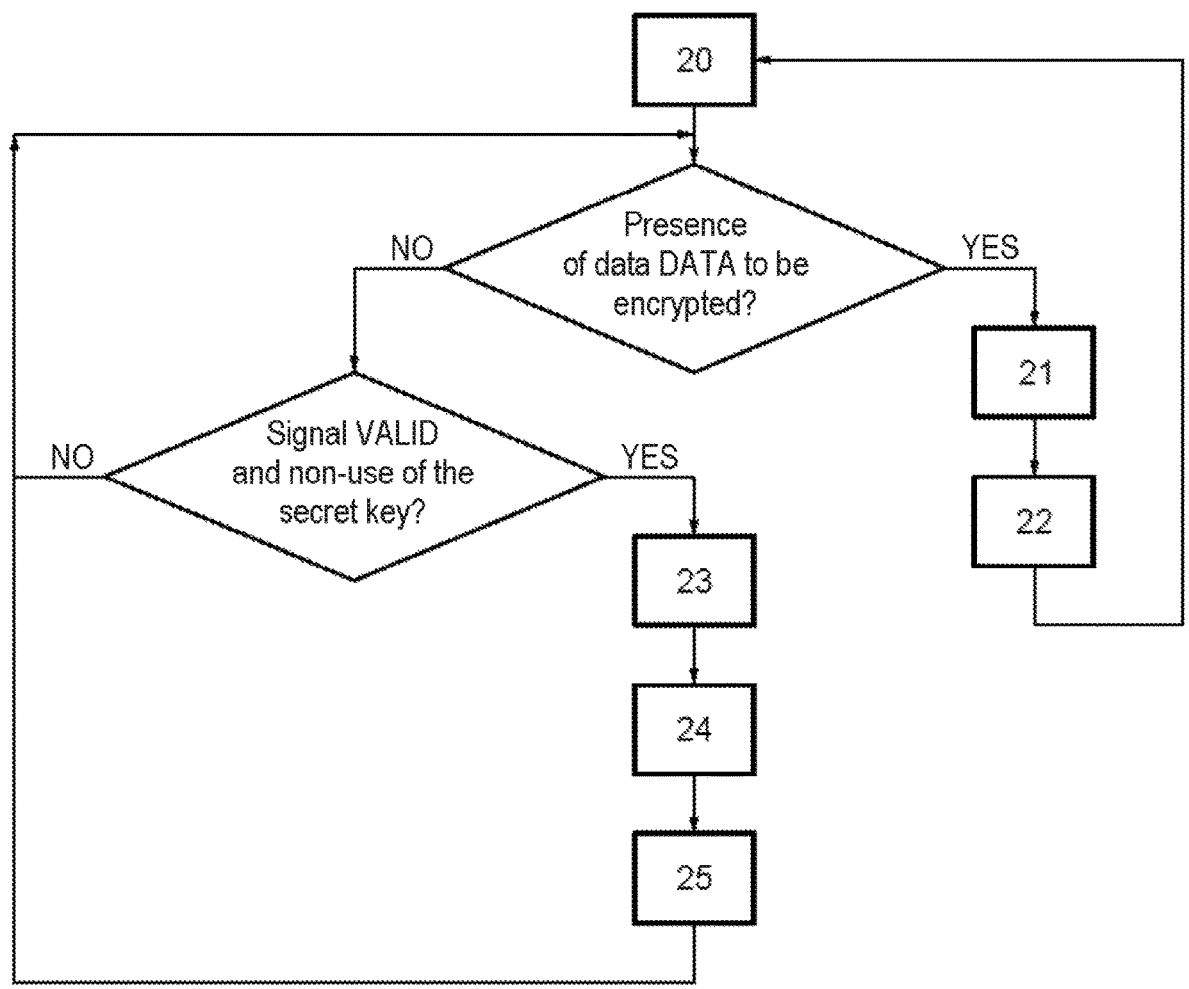

DEVICE FOR PROTECTING ENCRYPTED DATA AND ASSOCIATED METHOD

CROSS-REFERENCE TO RELATED APPLICATIONS

This application claims priority to French Patent Application No. 1905209, filed on May 17, 2019, which application is hereby incorporated herein by reference.

TECHNICAL FIELD

Embodiments of the invention relate to the integrated circuits that comprise secure modules, and in particular the protection of this type of circuit against analyses by side channels, known to a person skilled in the art as "side channel analysis", and more specifically against analyses of the electrical signals produced by the secure module during its operation.

BACKGROUND

During operation, the secure module produces electrical signals that are carried by metal tracks of the integrated circuit.

Data received by the secure module is encrypted using a secret key formed by a static or dynamic mask and by masked data. The mask and the masked data are respectively saved in a first and a second data register of the integrated circuit.

The mask and the masked data form a secret key.

The encryption techniques can implement a single temporary "session key" allowing decryption of the encrypted secret data, with the session key being supplied by a certified server.

The data is encrypted, for example, using an "AES" (Advanced Encryption Standard) type algorithm.

The masks protecting the secret key are generally refreshed at best once per encryption operation.

By analysing the electrical signals of the registers containing the masked data and the dynamic or static mask, using an antenna and dedicated mathematical algorithms, for example, it is possible to obtain information relating to the operations that are carried out, as well as to the manipulated data and/or the occurrences thereof.

In order to protect the secure module against a side channel analysis, only the updated data is masked anew.

Consequently, masked signals remain unchanged for several clock cycles.

When a signal on a track remains unchanged for a sufficient duration, for example, longer than 1 ms, a side channel analysis implementing a scanning microscope makes it possible to determine whether the track is in logic state "0" or "1".

By simultaneously comparing the logic state of the track and the logic values at the limits of the first and second registers containing the mask and the masked data, the logic state of a masked data bit and of a masking bit can be simultaneously determined, allowing decryption of the masked data bit, with the logic states being determined by analysing the tracks and the limits using a scanning microscope.

The secret data can be discovered by reiterating the decryption operation bit-by-bit.

A requirement exists for improving the protection of the masked data against side channel analyses, in particular side channel analyses implementing a scanning microscope.

SUMMARY

According to embodiments, it is advantageously proposed for the contents of two registers, which respectively contain a first mask and masked data and which together form a secret key, to be randomly masked and for the registers containing the secret key to be disposed such that the outputs of these registers are not simultaneously optically viewable.

According to one aspect, a method is proposed for protecting the contents of registers of a module of an integrated circuit, a first register containing a first mask and a second register containing masked data, the first mask and said masked data forming a secret key.

The method comprises the random generation of a second mask, as well as the masking of the secret key using the second mask.

This second mask can be considered to be a dynamic mask.

The generation of the second mask and the masking of the secret key are carried out when the secret key is not used for an encryption operation and during the reception of a validation signal.

The first and second registers are disposed in the secure module so that the outputs of these registers are not simultaneously optically viewable.

In practice, an attacker can use a scanning microscope.

According to one embodiment, the two registers are then spaced apart by a distance that is greater than the distance for simultaneously viewing the two registers, as well as the state of their outputs, using a scanning microscope, in view of the resolution of said scanning microscope.

As the distance separating the two registers forming the secret key is selected so that their outputs are not simultaneously viewable by an optical instrument, for example, greater than the distance allowing simultaneous viewing of the two registers, as well as the state of their outputs, in view of the resolution of a scanning microscope, it is not possible to simultaneously determine the state of the outputs of the registers containing the secret key.

Furthermore, combined with the remote arrangement of the registers, the masking of the secret key formed by the contents of the two registers, using a dynamic mask, enables a sequential acquisition of the state of the outputs of the registers containing the secret key to be prevented.

Furthermore, the development of the second mask and the masking of the second key by the second mask are carried out automatically and do not require the intervention of a processing unit for optimizing the resources and the consumption of the secure module.

According to one embodiment, the masking of the secret key comprises applying first logical operators on the second mask and on the content of each of the first and second registers, and the generation of the second mask comprises: randomly drawing an initial data item that is smaller than the second mask, splitting the initial data item into a plurality of data items (at least two) that are each smaller than the initial data item and assembling data using a second logical operator.

According to another embodiment, the initial data item is split from the initial word into a first data item, a second data item and a third data item that are each smaller than the initial data item, and the first, second and third data items are assembled by the second logical operator.

According to yet another embodiment, the masking of the secret key uses first logical operators, and the generation of the second mask comprises randomly drawing an initial data item that is smaller than the second mask, splitting the initial data item into a first data item, a second data item and a third data item that are each smaller than the initial data item and assembling first, second and third data items using a second logical operator.

According to yet another embodiment, the first logical operators and the second logical operator comprise EXCLUSIVE OR operators.

According to yet another embodiment, the initial data item comprises a 32 bit data item, the first data item comprises a 16 bit data item, the second data item and the third data item each comprise 8 bit data items.

The initial 32 bit data item simply needs to be drawn to create the second mask of 128 bits, for example. The energy consumption for generating the second mask is reduced.

According to one embodiment, the method comprises a reiteration, upon each occurrence of the validation signal, of the generation of the second mask and of the masking of the secret key.

Each reiteration includes overwriting the contents of the first and second registers, respectively, with the previous contents of these two registers masked by the second mask.

According to another embodiment, the duration separating two occurrences of the validation signal is selected so as to be shorter than the acquisition duration of an optical display device.

According to yet another embodiment, the generation of the validation signal is random.

The maximum duration separating two occurrences of the validation signal is advantageously selected so that it is shorter than the acquisition duration of an optical display device, for example, a scanning microscope, so that it is not possible to determine the state of the outputs of the first and second registers.

According to one embodiment, the contents of the first and second registers are modified after each encryption operation using said secret key.

Preferably, the first and second registers are configured to store 128 bit data items.

According to another aspect, an integrated circuit is proposed comprising a module comprising a first register containing a first mask, a second register containing masked data, the first mask and said masked data forming a secret key and processing means configured to generate a second mask and to mask the secret key with the second mask when the secret key is not used for an encryption operation and during the reception of a validation signal.

The first and second registers are disposed in the secure module so that the outputs of these registers are not simultaneously optically viewable.

According to one embodiment, the two registers are spaced apart by a distance that is greater than the distance for simultaneously viewing the two registers, as well as the state of their outputs, using a scanning microscope, in view of the resolution of said scanning microscope.

According to another embodiment, the processing means comprise generation means configured to generate the second mask and masking means comprising first logical operators able to mask the content of the first and second registers with the second mask, the generation means comprising an occurrence generator able to generate the validation signal, a random generator able to randomly generate an initial data item that is smaller than the second mask and a processing module able to split the initial data item into data items that are each smaller than the initial data item, said processing module being able to assemble the data using a second logical operator to create said second mask.

According to yet another embodiment, the processing module is able to split the initial data into a first data item, a second data item and a third data item that are smaller than the initial data word, said processing module being able to assemble the first, second and third data items using the second logical operator in order to create said second mask.

According to yet another embodiment, the first logical operators and the second logical operator comprise EXCLUSIVE OR operators.

Advantageously, the initial data item comprises a 32 bit data item, the first data item comprises a 16 bit data item, the second data item and the third data item comprise 8 bit data items each.

According to one embodiment, the processing means are able to generate the second mask, to mask the secret key and to overwrite the contents of the first and second registers, respectively, with the previous contents of these two registers masked anew by the second mask upon each occurrence of the validation signal.

According to another embodiment, the duration separating two occurrences of the validation signal is selected so as to be shorter than the acquisition duration of an optical viewing device.

According to another embodiment, the occurrence generator is able to randomly generate the validation signal.

According to yet another embodiment, the system further comprises means able to transmit the secret key to the first and second registers and able to modify the contents of the first and second registers after each encryption operation using said secret key.

According to yet another embodiment, the first and second registers comprise 128 bits.

According to another aspect, a device is proposed incorporating an integrated circuit as previously defined.

BRIEF DESCRIPTION OF THE DRAWINGS

Further advantages and features of the invention will become apparent from examining the detailed description of embodiments, which are by no means limiting, and the accompanying drawings, in which:

FIG. 1 illustrates an embodiment of an integrated circuit; and

FIG. 2 illustrates an embodiment of the integrated circuit.

DETAILED DESCRIPTION OF ILLUSTRATIVE EMBODIMENTS

Reference is made to FIG. 1, which represents an embodiment of an integrated circuit CI incorporated in an electronic device CP, for example, a smart card.

The integrated circuit CI comprises a system for protecting masked data comprising a module 2, for example, a secure module, and a first processing unit 3, for example, a secure processing unit.

The secure module 2 comprises a communication interface 4 connected, on the one hand, to the first secure processing unit 3 and, on the other hand, to a data bus 5.

The module 2 further comprises a first and a second register 6 and 7 each connected to the bus 5, a second processing unit 8 connected to the first and second registers 6 and 7.

The first register 6 comprises masked data items A and the second register 7 comprises a first mask B, with the content of the two registers 6 and 7 forming a secret key.

Of course, the mask B can be contained in the first register 6 and the masked data items A can be contained in the second register 7.

The module 2 further comprises processing means configured to generate a second mask M and to mask the secret key with the second mask M, when the secret key is not used for an encryption operation and during the reception of a validation signal VALID.

Masking the secret key allows sequential acquisition of the state of the outputs of the registers containing the secret key to be prevented.

The processing means comprise generation means configured to generate the second mask and masking means comprising first EXCLUSIVE OR operators OP1 and OP2 able to mask the content of the first and second registers 6 and 7 with the second mask M.

The generation means comprise an occurrence generator 9 able to generate the validation signal VALID, a random generator able to randomly generate an initial data item C, and a processing module 10 able to split the initial data item into a first data item E, a second data item F and a third data item G smaller than the initial data item.

The processing module 10 is able to assemble the first, second and third data items using a second logical operator 100.

The occurrence generator module 9 and the processing module 10 are each connected to the first and second registers 6 and 7, the random generator 11 is connected to the processing module 10 and to the occurrence generator module 9.

The processing module 10 is also connected to a first input of the operators OP1 and OP2.

A second input of the operator OP1 is connected to the first register 6, a second input of the operator OP2 is connected to the register 7, an output of the operator OP1 is connected to the first register 6 and an output of the operator OP2 is connected to the second register 7, so that when the second mask M is transmitted to the first input of the operators OP1 and OP2 by the processing module, the operators OP1 and OP2 mask the content of the first and second registers with the second mask M and therefore mask the secret key.

The first and second registers 6 and 7 are disposed in the secure module 2 so that the outputs of these registers are not simultaneously optically viewable, for example, using an optical device comprising a scanning microscope 13 having an analysis chamber and a screen 14.

The two registers are spaced apart by a distance DIST that is selected, for example, so that on the screen 14 of the microscope it is not possible to simultaneously view the two registers 6 and 7, as well as the state of their outputs, in view of the resolution of the microscope.

By way of an example, a distance DIST of at least 80 μm is acceptable.

As the distance DIST separating the two registers forming the secret key is greater than the distance for simultaneously viewing the two registers 6 and 7, as well as the state of their outputs, in view of the resolution of the microscope, it is not possible to simultaneously determine the state of the outputs of the registers containing the secret key.

The module 2 further comprises a third register 12 connected, on the one hand, to the bus 5 and, on the other hand, to a second processing unit 8 that uses the secret key to encrypt input data.

The first processing unit 3 communicates with the secure module 2 by means of the interface 4 and of the data bus 5.

The secure module 2 is clocked by a clock, not shown.

The first, second and third registers 6, 7 and 12 are of the volatile type, for example, a volatile memory.

The first register 6 comprises masked data items A comprising 128 bits A[i], with i varying from 1 to 128, and the second register 7 comprises a mask B comprising 128 bits B[j], with j varying from 0 to 128.

The first and second registers 6 and 7 containing the data items A and B are configured to store 128 bit data items.

According to another embodiment, the data items A and B forming the secret key can comprise more or less than 128 bits, with the first and second registers 6 and 7 being configured to store the masked data items A and the mask B.

Dividing the secret key into two data items A and B allows the secret key to be protected against side channel attacks.

The masked data items A and the mask B are supplied by the first processing unit 3.

The first processing unit 3 is also able to modify the contents of the first and second registers 6 and 7 after each encryption operation by the unit 8 using said secret key.

The first processing unit 3 also supplies input data DATA intended to be encrypted.

The data DATA is saved in the third register 12.

The second processing unit 8 is able to encrypt the data DATA contained in the third register 12 on the basis of the secret key contained in the first and second registers 6 and 7.

The second processing unit 8 generates output data CRYPT corresponding to the encrypted input data DATA.

The data CRYPT is saved in the third register 12 so as to overwrite the data DATA.

The second processing unit 8 is produced, for example, from a microprocessor, but it can be any device able to encrypt data on the basis of a secret key contained in two registers, and to save the encrypted data in a register.

The first processing unit 3 loads the masked data items A into the first register 6 and loads the mask B into the second register 7.

Furthermore, the first processing unit 3 loads that data to be encrypted DATA into the third register 12 and retrieves the encrypted data CRYPT saved in the third register 12.

The first processing unit 3 is produced, for example, from a microprocessor, but it can be any device able to load the masked data items A into the first register 6, able to load the mask B into the second register 7, able to load the data to be encrypted DATA into the third register 12 and able to retrieve the encrypted data CRYPT saved in the third register 12.

The occurrence generator module 9 randomly generates, for example, a validation signal VALID.

By way of a variant, the occurrence generator module 9 deterministically generates the validation signal VALID.

The signal VALID is transmitted to the first and second registers 6 and 7, and to the random generator 11.

The occurrence generator module 9 is, for example, produced by a counter comprising toggles, for example.

Hereafter, it is assumed that the initial data item C comprises a 32 bit data item, the first data item E comprises a 16 bit data item, the second data item F and the third data item G comprise data items of 8 bits each, and the second logical operator 100 comprises EXCLUSIVE OR operators.

The random generator 11 carries out a random draw, upon reception of the signal VALID emitted by the occurrence generator module 9, of the initial data item C comprising 32 bits C[k], with k varying from 1 to 32.

The data item C is transmitted to the processing module 10.

On the basis of the data item C, the processing module 10 generates the second mask M comprising 128 bits M[l], with l varying from 1 to 128.

More specifically, the processing unit 10 randomly splits the initial data item C in order to obtain the first, second and third data items E, F and G.

The processing module 10 then generates the mask M according to the following equation (1):

$$M[l]=E[ENT[l \bmod 16]] \text{XOR } F[ENT[l/16]] \text{XOR } G[ENT[(l+l/16) \bmod 8)]],$$

with l varying from 1 to 128, where ENT[ ] is the integer part, mod is the modulo, E is the data item E comprising 16 bits E[p], with p varying from 1 to 16, F is the data item F comprising 8 bits F[q], with q varying from 1 to 8, and G is the data item G comprising 8 bits G[r], with r varying from 1 to 8, and XOR is the Boolean EXCLUSIVE OR operator 100.

The initial data item C of 32 bits simply needs to be drawn in order to create the second mask M of 128 bits. The energy consumption for generating the second mask M is reduced.

Furthermore, a generator generating 32 bits occupies less space on the silicon than a generator generating 128 bits.

Of course, the embodiment of the mask M comprising 128 bits on the basis of the initial data item C comprising 32 bits is applicable for a different sized initial data item and for a different sized second mask.

By way of a variant, the initial data item C can be split into a plurality of data items, for example, two or more than three data items, each being smaller than the initial data item, with the processing module 10 splitting the initial data item C into data items that are each smaller than the initial data item and assembling the data using the second logical operator 100 in order to create said second mask M.

The data items that are smaller than the initial data item C are sized so that the second mask M is the same size as the secret key for using encryption algorithms implementing different sized secret keys.

The processing module 10 is defined, for example, on the basis of logic circuits.

FIG. 2 shows an embodiment of the system 1 for protecting masked data.

During a step 20, for example, the first processing unit 3 loads the masked data items A and the mask B into the first and second registers 6 and 7.

Furthermore, the first processing unit 3 can load the data DATA to be encrypted into the third register 12.

If the third register 12 contains data DATA to be encrypted, then the system proceeds to step 21, for example.

During step 21, for example, the second processing unit 8 encrypts the data DATA contained in the third register 12 by using the secret key formed by the masked data items A and the mask B contained in the first and second registers 6 and 7 in order to obtain the encrypted data CRYPT.

When the encrypted data CRYPT has been generated by the second processing unit 8, the data CRYPT is saved in the third register 12 so as to overwrite the previous content of the third register 12.

Then, in a step 22, for example, when the data CRYPT has been saved in the third register 12, the first processing unit 3 loads, for example, in an internal memory, the encrypted data CRYPT for subsequent use.

The system then returns to step 20, in which step the first processing unit 3 modifies the masked data items A and the mask B so that the content of the first and second registers 6 and 7 is unique.

The contents of the first and second registers 6 and 7 are modified after each encryption operation using the secret key.

If the secret key is used or if the occurrence generator module 9 does not deliver a signal VALID, then the system returns to step 20.

If the secret key is not used and the occurrence generator module 9 delivers the signal VALID, then the system proceeds to step 23.

During step 23, the random generator 11 generates the initial data item C of 32 bits upon reception of the signal VALID.

Then, in step 24, for example, the processing module 10 generates the second mask M according to equation (1).

When the second mask M is generated, during a step 25, for example, the content of the first and second registers 6 and 7 is updated according to the following equations:

$$A[i]=A[i] \text{XOR } M[i]; \text{ and}$$

$$B[i]=B[i] \text{XOR } M[i],$$

with i varying from 1 to 128 and n=0, with XOR being the EXCLUSIVE OR operator used in this example by both the operators referenced OP1 and OP2.

The system then returns to step 20.

Upon each occurrence of the validation signal VALID, the generation of the second mask M and the masking of the secret key with the second mask is reiterated and the contents of the first and second registers 6 and 7, respectively, are overwritten by the contents of these two registers masked by the second mask M.

The first processing unit 3 can load data items A and B into the first and second registers 6 and 7, and data items DATA into the third register 12, whilst the second processing unit 8 does not proceed with the encryption of data DATA.

The maximum duration separating two occurrences of the signal VALID is selected so that it is shorter than the acquisition duration of an optical display device, so that it is not possible to determine the state of the outputs of the first and second registers before an encryption operation of the secret key by the dynamic mask.

The maximum duration separating two occurrences of the valid signal is shorter than 1 ms, for example.

Furthermore, the development of the second mask and the masking of the secret key are carried out automatically and do not require the intervention of a processing unit allowing the resources and the consumption to be optimized.

What is claimed is:

1. A method for protecting contents of registers of a secure module of an integrated circuit, wherein the secure module comprises a first register containing a first mask and a second register containing masked data, the first mask and the masked data forming a secret key, the method comprising:

randomly generating a second mask in the secure module; and masking the secret key using the second mask when the secret key is not used for an encryption operation and during a reception of a validation signal, wherein the first register is spaced apart from the second register by a distance of at least 80 µm, and wherein the integrated circuit is incorporated in a smart card.

2. The method according to claim 1, wherein masking of the secret key comprises applying first logical operators on the second mask and on a content of each of the first and second registers, and wherein generating the second mask comprises randomly drawing an initial data item that is smaller than the second mask, splitting the initial data item into a plurality of data items that are each smaller than the initial data item, and assembling data using a second logical operator.

3. The method according to claim 2, wherein splitting the initial data item comprises splitting the initial data item into a first data item, a second data item and a third data item that are each smaller than the initial data item, and the first, second and third data items are assembled by the second logical operator.

4. The method according to claim 3, wherein the initial data item comprises a 32 bit data item, the first data item comprises a 16 bit data item, the second data item and the third data item each comprises 8 bit data items, and the first and second logical operators comprise EXCLUSIVE OR operators.

5. The method according to claim 2, wherein the first logical operators and the second logical operator comprise EXCLUSIVE OR operators.

6. The method according to claim 1, further comprising generating the second mask and the masking of the secret key upon each occurrence of the validation signal in a reiteration, and each reiteration includes overwriting contents of the first and second registers respectively, with previous contents of the first and second registers masked by the second mask.

7. The method according to claim 1, wherein the validation signal is randomly generated.

8. The method according to claim 1, further comprising modifying contents of the first and second registers after each encryption operation using the secret key.

9. The method according to claim 1, wherein the first and second registers are configured to store 128 bit data items.

10. An integrated circuit comprising:
a secure module comprising a first register configured to store a first mask and a second register configured to store masked data, the first mask and the masked data forming a secret key; and
a processor configured to:
generate a second mask; and
mask the secret key with the second mask when the secret key is not used for an encryption operation and during a reception of a validation signal,
wherein the first register is paced apart from the second register by a distance of at least 80 µm, and
wherein the integrated circuit is incorporated in a smart card.

11. The integrated circuit according to claim 10, wherein the processor comprises a generator configured to generate the second mask and a masking unit comprising first logical operators configured to mask contents of the first and second registers with the second mask, and wherein the generator comprising an occurrence generator configured to generate the validation signal, a random generator configured to randomly generate an initial data item that is smaller than the second mask and a processing module configured to split the initial data item into data items that are each smaller than the initial data item, the processing module configured to assemble data using a second logical operator in order to create the second mask.

12. The integrated circuit according to claim 11, wherein the processing module is configured to split the initial data item into a first data item, a second data item and a third data item that are smaller than the initial data item, and wherein the processing module is configured to assemble the first, second and third data items using the second logical operator in order to create the second mask.

13. The integrated circuit according to claim 12, wherein the initial data item comprises a 32 bit data item, the first data item comprises a 16 bit data item, the second data item and the third data item comprise 8 bit data items each.

14. The integrated circuit according to claim 11, wherein the first logical operators and the second logical operator comprise EXCLUSIVE OR operators.

15. The integrated circuit according to claim 11, wherein the occurrence generator is configured to randomly generate the validation signal.

16. The integrated circuit according to claim 10, wherein the processor is configured to:
generate the second mask;
mask the secret key; and
overwrite contents of the first and second registers respectively, with previous contents of the first and second registers masked anew by the second mask upon each occurrence of the validation signal.

17. The integrated circuit according to claim 10, further comprising a first processing unit configured to:
transmit the secret key to the first and second registers; and
modify contents of the first and second registers after each encryption operation using the secret key.

18. The integrated circuit according to claim 10, wherein the first and second registers are configured to store 128 bit data items.

* * * * *